(12) United States Patent
Wood et al.

(10) Patent No.: US 9,640,083 B1
(45) Date of Patent: May 2, 2017

(54) METHOD AND SYSTEM FOR PROVIDING CONTENT FOR LEARNING APPLIANCES OVER AN ELECTRONIC COMMUNICATION MEDIUM

(75) Inventors: Michael C. Wood, Orinda, CA (US); Heather Regan, San Francisco, CA (US)

(73) Assignee: Leapfrog Enterprises, Inc., Emeryville, CA (US)

( * ) Notice: Subject to any disclaimer, the term of this patent is extended or adjusted under 35 U.S.C. 154(b) by 2859 days.

(21) Appl. No.: 10/374,736

(22) Filed: Feb. 24, 2003

Related U.S. Application Data

(60) Provisional application No. 60/360,278, filed on Feb. 26, 2002.

(51) Int. Cl.
*G09B 5/00* (2006.01)
*G09B 7/00* (2006.01)
(Continued)

(52) U.S. Cl.
CPC .............. *G09B 5/00* (2013.01); *A63H 30/04* (2013.01); *G06F 17/3089* (2013.01); *G06Q 20/105* (2013.01); *G06Q 20/3821* (2013.01); *G06Q 30/0601* (2013.01); *G06Q 30/0621* (2013.01); *G06Q 30/0643* (2013.01); *G09B 5/04* (2013.01); *G09B 5/06* (2013.01); *G09B 5/062* (2013.01); *G09B 5/065* (2013.01); *G09B 7/00* (2013.01); *G09B 7/02* (2013.01); *G09B 7/04* (2013.01); *G09B 17/003* (2013.01);
(Continued)

(58) Field of Classification Search
CPC ... G09B 5/00; G09B 5/04; G09B 5/06; G09B 7/00; G09B 7/04; G09B 17/006; G09B 27/08; G09B 29/106; G06Q 20/105; G06Q 20/3821; G06Q 30/0601; G06Q 30/0621; G06Q 30/0643; G06F 17/3089; A63F 2300/50; A63F 2300/206; A63F 2300/407
USPC ...... 434/118, 350; 446/175, 301; 463/42, 43
See application file for complete search history.

(56) References Cited

U.S. PATENT DOCUMENTS

| 882,604 A | 3/1908 | Wood |
|---|---|---|
| 2,826,828 A | 3/1958 | Hamilton |

(Continued)

FOREIGN PATENT DOCUMENTS

| JP | S59-44078 A | 3/1984 |
|---|---|---|
| JP | S61-252575 A | 11/1986 |

(Continued)

OTHER PUBLICATIONS

Frangos, Alex, "E-Commerce (A Special Report): Essay—Here's My Advice . . . If Amazon has a suggestion for you, be prepared for some good ideas—and a lot of confusion", Wall Street Journal (Eastern edition). New York, N.Y.: Jan. 14, 2002. p. R. 15.*

(Continued)

*Primary Examiner* — Nikolai A Gishnock
(74) *Attorney, Agent, or Firm* — Kilpatrick Townsend & Stockton LLP

(57) ABSTRACT

A method for providing electronic content for a learning appliance is disclosed. The method includes selecting a learning appliance from a set of different learning appliances on a host site. The set of learning appliances is previously selected from a group of learning appliances. The electronic content package is received and is loaded into the learning appliance.

24 Claims, 9 Drawing Sheets

(51) Int. Cl.
*G09B 19/02* (2006.01)
*A63H 30/04* (2006.01)
*G09B 7/02* (2006.01)
*G09B 5/06* (2006.01)
*G09B 17/00* (2006.01)
*G09B 19/00* (2006.01)
*G09B 7/04* (2006.01)
*G09B 27/08* (2006.01)
*G09B 5/04* (2006.01)
*G09B 29/10* (2006.01)
*G06Q 20/38* (2012.01)
*G06Q 30/06* (2012.01)
*G06Q 20/10* (2012.01)
*G06F 17/30* (2006.01)

(52) U.S. Cl.
CPC ........... *G09B 17/006* (2013.01); *G09B 19/00* (2013.01); *G09B 19/025* (2013.01); *G09B 27/08* (2013.01); *G09B 29/106* (2013.01); *A63F 2300/206* (2013.01); *A63F 2300/407* (2013.01); *A63F 2300/50* (2013.01)

(56) References Cited

U.S. PATENT DOCUMENTS

| | | |
|---|---|---|
| 2,921,385 A | 1/1960 | Hamilton |
| 3,052,041 A | 9/1962 | Luxton et al. |
| 3,100,365 A | 8/1963 | Stalder |
| 3,371,321 A | 2/1968 | Adams |
| 3,593,433 A | 7/1971 | Dillon |
| 3,660,913 A | 5/1972 | Heath |
| 3,949,488 A | 4/1976 | Welch |
| 3,977,292 A | 8/1976 | Favilli et al. |
| 4,040,206 A | 8/1977 | Kimura |
| 4,217,726 A | 8/1980 | Flicker et al. |
| 4,356,658 A | 11/1982 | Goldfarb |
| 4,431,312 A | 2/1984 | Chambers et al. |
| 4,671,514 A | 6/1987 | Wilson-Diehl |
| 4,679,789 A | 7/1987 | Okada |
| 4,690,645 A | 9/1987 | Ukisu |
| 4,840,602 A | 6/1989 | Rose |
| 4,846,693 A | 7/1989 | Baer |
| 4,889,027 A | 12/1989 | Yokoi |
| 4,923,428 A | 5/1990 | Curran |
| 4,983,890 A | 1/1991 | Satoh et al. |
| 4,997,374 A | 3/1991 | Simone |
| 5,002,491 A | 3/1991 | Abrahamson et al. |
| 5,013,276 A | 5/1991 | Garfinkel |
| 5,018,082 A | 5/1991 | Obata et al. |
| 5,040,319 A | 8/1991 | Wang et al. |
| 5,095,798 A | 3/1992 | Okada et al. |
| 5,114,376 A | 5/1992 | Copley et al. |
| 5,122,952 A | 6/1992 | Minkus |
| 5,184,830 A | 2/1993 | Okada et al. |
| 5,188,533 A | 2/1993 | Wood |
| 5,191,615 A | 3/1993 | Aldava et al. |
| 5,204,968 A | 4/1993 | Parthasarathi |
| 5,245,656 A | 9/1993 | Loeb et al. |
| 5,261,823 A | 11/1993 | Kurokawa |
| 5,267,865 A | 12/1993 | Lee et al. |
| 5,270,480 A | 12/1993 | Hikawa |
| 5,302,132 A | 4/1994 | Corder |
| 5,307,263 A | 4/1994 | Brown |
| RE34,728 E | 9/1994 | Hall-Tipping |
| 5,345,153 A | 9/1994 | Vaught |
| 5,377,100 A | 12/1994 | Pope et al. |
| 5,387,104 A | 2/1995 | Corder |
| 5,412,890 A | 5/1995 | Fechter |
| 5,413,355 A | 5/1995 | Gonzalez |
| 5,478,240 A | 12/1995 | Cogliano |
| 5,485,068 A | 1/1996 | Vaught |
| 5,493,185 A | 2/1996 | Mohr et al. |
| 5,511,980 A * | 4/1996 | Wood ................. 434/169 |
| 5,513,308 A | 4/1996 | Mori |
| D370,221 S | 5/1996 | Firlow |
| 5,535,321 A | 7/1996 | Massaro et al. |
| 5,562,453 A | 10/1996 | Wen |
| 5,587,545 A | 12/1996 | Nakada et al. |
| 5,597,312 A | 1/1997 | Bloom et al. |
| 5,614,940 A | 3/1997 | Cobbley et al. |
| 5,636,994 A | 6/1997 | Tong |
| 5,655,945 A | 8/1997 | Jani |
| D384,703 S | 10/1997 | Chuang |
| 5,681,170 A | 10/1997 | Rieber et al. |
| 5,683,082 A | 11/1997 | Takemoto et al. |
| 5,685,776 A | 11/1997 | Stambolic et al. |
| 5,697,829 A | 12/1997 | Chainani et al. |
| 5,717,923 A | 2/1998 | Dedrick |
| 5,724,074 A | 3/1998 | Chainani et al. |
| 5,727,950 A | 3/1998 | Cook et al. |
| 5,727,951 A | 3/1998 | Ho et al. |
| 5,733,131 A | 3/1998 | Park |
| 5,740,549 A | 4/1998 | Reilly et al. |
| 5,746,602 A * | 5/1998 | Kikinis ................. 434/169 |
| 5,752,880 A | 5/1998 | Gabai et al. |
| 5,754,939 A | 5/1998 | Herz et al. |
| 5,761,662 A | 6/1998 | Dasan |
| 5,766,077 A | 6/1998 | Hongo |
| 5,774,118 A | 6/1998 | Hatakama |
| 5,779,486 A | 7/1998 | Ho et al. |
| 5,788,508 A | 8/1998 | Lee et al. |
| 5,800,243 A | 9/1998 | Berman |
| 5,813,861 A | 9/1998 | Wood |
| 5,819,284 A | 10/1998 | Farber et al. |
| 5,820,386 A | 10/1998 | Sheppard, II |
| 5,823,781 A | 10/1998 | Hitchcock et al. |
| 5,829,983 A | 11/1998 | Koyama et al. |
| RE36,028 E | 1/1999 | Deesen et al. |
| 5,855,483 A | 1/1999 | Collins et al. |
| 5,863,208 A | 1/1999 | Ho et al. |
| 5,873,765 A | 2/1999 | Rifkin et al. |
| 5,879,163 A | 3/1999 | Brown et al. |
| D407,939 S | 4/1999 | Bear |
| D410,165 S | 5/1999 | Bear |
| 5,902,116 A | 5/1999 | Rieber et al. |
| 5,904,485 A | 5/1999 | Siefert |
| 5,910,009 A | 6/1999 | Leff et al. |
| 5,915,238 A | 6/1999 | Tjaden |
| 5,926,442 A | 7/1999 | Sirhan et al. |
| D413,149 S | 8/1999 | Chan et al. |
| 5,944,533 A | 8/1999 | Wood |
| 5,945,985 A * | 8/1999 | Babin et al. ................ 715/500.1 |
| 5,947,474 A | 9/1999 | Kanagawa et al. |
| 5,952,932 A | 9/1999 | Sorensen |
| 5,957,699 A | 9/1999 | Peterson et al. |
| 5,962,839 A | 10/1999 | Eskildsen |
| 5,967,793 A | 10/1999 | Ho et al. |
| 5,971,850 A | 10/1999 | Liverance |
| 5,971,855 A | 10/1999 | Ng |
| 5,995,455 A | 11/1999 | Kutosky |
| 6,010,339 A | 1/2000 | McDonald |
| 6,012,961 A | 1/2000 | Sharpe, III et al. |
| 6,021,306 A | 2/2000 | McTaggart |
| 6,029,042 A | 2/2000 | Yaron-Moallim |
| 6,036,496 A | 3/2000 | Miller et al. |
| 6,039,575 A | 3/2000 | L'Allier et al. |
| 6,039,625 A | 3/2000 | Wang |
| 6,042,478 A | 3/2000 | Ng |
| 6,045,430 A | 4/2000 | How |
| 6,064,854 A | 5/2000 | Peters et al. |
| 6,064,856 A | 5/2000 | Lee et al. |
| 6,074,212 A | 6/2000 | Cogliano |
| 6,075,195 A | 6/2000 | Gabai et al. |
| 6,083,104 A | 7/2000 | Choi |
| 6,089,942 A | 7/2000 | Chan et al. |
| 6,112,442 A | 9/2000 | Liang |
| 6,130,892 A | 10/2000 | Short et al. |
| 6,135,776 A * | 10/2000 | Erturk et al. ................. 434/276 |
| 6,142,784 A | 11/2000 | Wood |
| 6,144,673 A | 11/2000 | Korus |
| 6,149,441 A | 11/2000 | Pellegrino et al. |
| D434,799 S | 12/2000 | Wood |

(56) References Cited

U.S. PATENT DOCUMENTS

| | | |
|---|---|---|
| 6,159,101 A | 12/2000 | Simpson |
| 6,160,986 A * | 12/2000 | Gabai et al. .................. 434/308 |
| 6,164,975 A | 12/2000 | Weingarden et al. |
| 6,179,682 B1 | 1/2001 | Plain et al. |
| 6,190,178 B1 | 2/2001 | Oh |
| 6,192,215 B1 | 2/2001 | Wang |
| 6,192,340 B1 | 2/2001 | Abecassis |
| 6,202,060 B1 | 3/2001 | Tran |
| 6,206,750 B1 | 3/2001 | Barad et al. |
| 6,211,451 B1 | 4/2001 | Tohgi et al. |
| 6,270,351 B1 * | 8/2001 | Roper .......................... 434/118 |
| 6,270,352 B1 | 8/2001 | Ditto |
| 6,290,504 B1 | 9/2001 | Benitz et al. |
| 6,290,566 B1 | 9/2001 | Gabai et al. |
| 6,299,452 B1 | 10/2001 | Wasowicz et al. |
| 6,301,462 B1 | 10/2001 | Freeman et al. |
| 6,317,714 B1 | 11/2001 | Del Castillo et al. |
| 6,319,010 B1 | 11/2001 | Kikinis |
| 6,328,569 B1 | 12/2001 | Jenkins et al. |
| 6,330,426 B2 | 12/2001 | Brown et al. |
| 6,368,177 B1 | 4/2002 | Gabai et al. |
| 6,394,872 B1 | 5/2002 | Watanabe et al. |
| 6,427,063 B1 | 7/2002 | Cook et al. |
| 6,443,796 B1 | 9/2002 | Shackelford |
| 6,463,257 B1 | 10/2002 | Wood |
| 6,572,431 B1 | 6/2003 | Maa |
| 6,773,344 B1 * | 8/2004 | Gabai et al. ....................... 463/1 |
| 6,801,751 B1 * | 10/2004 | Wood et al. .................. 434/362 |
| 6,816,703 B1 | 11/2004 | Wood et al. |
| 6,845,398 B1 | 1/2005 | Galensky et al. |
| 6,882,824 B2 * | 4/2005 | Wood .......................... 434/308 |
| 7,213,005 B2 * | 5/2007 | Mourad et al. ................. 705/64 |
| 7,818,400 B2 | 10/2010 | Wood et al. |
| 2001/0053980 A1 * | 12/2001 | Suliman et al. .................. 705/1 |
| 2002/0022523 A1 * | 2/2002 | Dan et al. ....................... 463/42 |
| 2002/0032708 A1 | 3/2002 | Gupta et al. |
| 2002/0082952 A1 * | 6/2002 | Johnston ........................ 705/27 |
| 2003/0059757 A1 | 3/2003 | Wood |
| 2003/0064812 A1 * | 4/2003 | Rappaport et al. ............. 463/43 |
| 2003/0129576 A1 | 7/2003 | Wood et al. |
| 2011/0029591 A1 | 2/2011 | Wood et al. |

FOREIGN PATENT DOCUMENTS

| | | |
|---|---|---|
| JP | 2003-527628 A | 9/2003 |
| WO | WO 99/65007 A1 | 12/1999 |
| WO | WO 01/41101 A1 | 6/2001 |
| WO | WO 01/41114 A1 | 6/2001 |

OTHER PUBLICATIONS

Edwards, Marcelene, "Customizing online shopping Amazon: E-tailer shows each customer a different Web page, reflecting past buys, preferences in books, music; [South Sound Edition]", The News Tribune. Tacoma, Wash.: Jun. 27, 2001. p. D.1.*

Mary Kathleen Flynn with Melissa J. Perenson, "The Daily Me", PC Magazine, Sep. 14, 1993, p. 29.

John R. Quain, "Journalist Delivers Your Own Personalized Newspaper", PC Magazine, Oct. 12, 1993, p. 49.

"Classic Toys 2001: VTech Industries, Little Smart Tiny Touch Phone", <http://www.drtoy.org/drtoy/vtech.sub.-tinytouch.sub.-2001c.htm>, 1990.

LeapFrog "Create-a-Word SuperMat" and "Create-a-Word Traveler" Manual, 2 pages, 1997.

VTech Fun to Talk Phone Manual, 5 pages, 1993.

VTech Little Smart Dial a Smile Manual, 6 pages, 1993.

VTech Smart Play, "Little Smart Alphabet Desk", 3 pages, 1992.

VTech Smart Play, "Little Smart Number Desk", 4 pages, 1995.

VTech Smart Play, "Video Painter", 3 pages, 1993.

Bannan et al. "Mattel My Interactive Pooh", PC Magazine, Dec. 14, 1998 (1 page).

Inventor News, Jul. 30, 1998 (3 pages).

Ricadela, "Interactive Dolls The Talk of toy Fair", Computer Retail Week, Feb. 9, 1998 (3 pages).

LEGO® MINDSTORMS™ Robotics Invention System™, http://www.legomindstorms.com/press/whatis,asp (Oct. 30, 1999) (3 pages).

Final Office Action, dated Oct. 2, 2014, in U.S. Appl. No. 12/506,133. 21 pages.

VTech "Little Smart Number Desk" Manual, 6 pages (estimated publication date before 1995).

Non-Final Office Action dated Sep. 11, 2015 for U.S. Appl. No. 12/506,133, 13 pages.

* cited by examiner

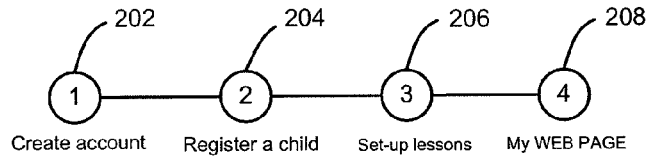

```
        202         204         206         208
         1 --------- 2 --------- 3 --------- 4
   Create account  Register a child  Set-up lessons  My WEB PAGE
```

Step 1 - Create account

| | |
|---|---|
| User Name:<br>No spaces (ex. MaryBeth)<br>Must be an adult | JohnSmithR |
| Password:<br>(6 or more characters) | |
| Re-type Password: | |
| Your First Name: | john |
| Your Last Name: | smith |
| Your Year of Birth: | 1965 ▼ |
| LeapFrog Page Name:<br>What do you want to name your My Web Page (ex. The Garvin Family)? | smith family |
| Your Email Address: | johnsmithat@abc.com |

} 210

(>) NEXT STEP    214

Fig. 4

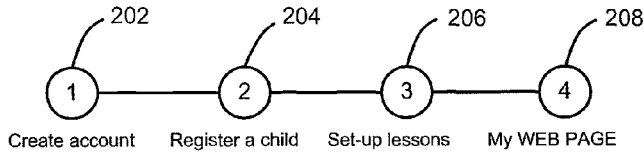

Step 2 - Register a child

Do you want your child to sign in without parental supervision? If so, click here to create a user name for your child.

Child's First Name: [matthew]

⎱ 224

Child's LeapFrog Toys
To create a My LeapFrog page, you must first select which Internet-enabled toys you own.

- ☐ Imagination Desk™
- ☑ iQuest™ Handheld
- ☐ Leap's Learning Band™
- ☐ LeapPad® Learning System
- ☐ LeapPad® Advantage
- ☐ LeapPad® Pro
- ☐ School-Time LeapTop™
- ☑ Turbo Twist™ Fact Blaster
- ☐ Turbo Twist™ Math
- ☑ Turbo Twist™ Spelling
- ☐ Turbo Twist™ Vocabulator

⎱ 222

Child's School Grade: [Select one ▼]

The following information is optional:

Child's Birthday: Month [Month ▼] Day [Day ▼] Year [ ]

⎱ 226

To add another child to your membership, click ADD ANOTHER CHILD. If not, click NEXT STEP.

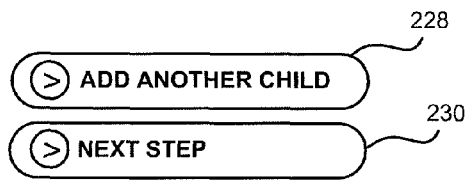

(>) ADD ANOTHER CHILD — 228
(>) NEXT STEP — 230

Fig. 5

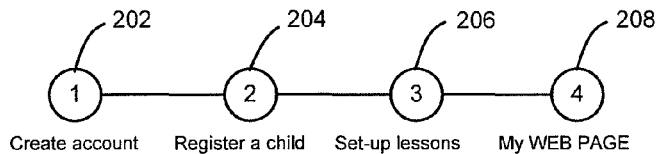

Create account — Register a child — Set-up lessons — My WEB PAGE

Step 3 - Set-up lessons

232
→ matthew

LeapFrog® Never-Ending Learning Club - iQuest™ Handheld
Prepare for tests with fun, interactive audio quiz games, and chapter outlines from your school textbook.

⦿ 52-week Program
  A curriculum-based program delivering weekly activity packs and email reminders.
  ☑ Yes, send me email reminders

LeapFrog® Never-Ending Learning Club - Turbo Twist™ Spelling
Learn to spell like a pro with your personal brain trainer.

⦿ 52-week Program
  A curriculum-based program delivering weekly activity packs and email reminders. ⟵ 238
  ☑ Yes, send me email reminders ○ Self-Paced Program
  A program that prescribes new activities based on your child's progress.

LeapFrog® Never-Ending Learning Club - Turbo Twist™ Fact Blaster
Learn loads of important facts in seven educational categories.

⦿ 52-week Program
  A curriculum-based program delivering weekly activity packs and email reminders.
  ☑ Yes, send me email reminders ○ Self-Paced Program
  A program that prescribes new activities based on your child's progress.

Imagination Desk Activity Sheets

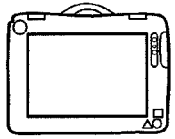

Select a week below to get the audio that makes the activity sheets come to life. You can then print the corresponding coloring pages in the following steps.

Have you installed LeapPrint?

302 ⟶

◉ VIEW PAST ACTIVITY PACKS

1 - 10 of 15    More ▶

ACTIVITY SHEET NAME

◉ GET — Get Ready for Kindergarten - Week 15
Learn letters and phonics - V, W and X/Y/Z ◉ GET — Get Ready for Kindergarten - Week 14
Learn letters and phonics - S, T and U ◉ GET — Get Ready for Kindergarten - Week 13
Learn letters and phonics - P, Q and R ◉ GET — Get Ready for Kindergarten - Week 12
Learn letters and phonics - M, N and O ◉ GET — Get Ready for Kindergarten - Week 11
Learn letters and phonics - J, K and L ◉ GET — Get Ready for Kindergarten - Week 10
Learn letters and phonics - G, H and I

300

◉ GET — Get Ready for Kindergarten - Week 9
Learn letters and phonics - D, E and F ◉ GET — Get Ready for Kindergarten - Week 8
Learn letters and phonics - A, B and C ◉ GET — Get Ready for Kindergarten - Week 7
Learn numbers and counting - 19, 20 and review ◉ GET — Get Ready for Kindergarten - Week 6

FIG. 8

Download Your Activity Sheets

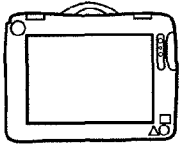

Get Ready for Kindergarten - Week 15
Grade level: pre-K
Product: Imagination Desk

Imagination Desk

Step 1 - Download Audio > Step 2 - Print Activity Sheets

Examples of what this activity pack includes:

Learn letters and phonics - V, W and X/Y/Z

- Sheet 1: Leap watches Mom play VIOLIN
- Sheet 2: Tad and Dad wash the WINDOW
- Sheet 3: Lily sees her YO-YO in an X-RAY at the ZOO

Get Ready for Kindergarten - Week 15

 DOWNLOAD AUDIO ← 306

GETTING YOUR ACTIVITY SHEET

1. Make sure you have exited all programs that use your serial-port (Palm™ software or digital camera).
2. Make sure the Mind Station is connected to the computer, the cartridge is in the slot and the light is on.

METHOD AND SYSTEM FOR PROVIDING CONTENT FOR LEARNING APPLIANCES OVER AN ELECTRONIC COMMUNICATION MEDIUM

CROSS-REFERENCES TO RELATED APPLICATIONS

This application is a non-provisional application of U.S. Provisional Patent Application No. 60/360,278, filed on Feb. 26, 2002. This U.S. Provisional Patent Application is herein incorporated by reference in its entirety for all purposes.

BACKGROUND OF THE INVENTION

Many electronic learning appliances are commercially available. One problem with conventional learning appliances is that they have limited content. For example, an educational toy may include specific educational content that is pre-stored on a ROM (read only memory) chip within the toy. The chip contains only a limited amount of audio and/or visual data and the visual and audio outputs that the toy can produce are therefore limited. Children can easily become bored with the toy over a short period of time. This may also frustrate parents who may buy the toy only to see their children not use the toy.

In order to provide new content for an educational toy, a memory chip that is used in a toy could be re-programmed with new audio and visual data from an external source. For example, one conventional Web site allowed users to download new audio data for toys to change the content of the toys. Separate links were provided for each of the separate toys. When a link for a particular toy was selected, the audio data could be downloaded and then used in a person's toy.

Although the Web site was useful, a number of improvements could be made. First, a person had to search through the Web site trying to find the particular toys that the user owned each time the Web site was visited. The person had to look for the person's toy among other toys that the user did not have. This process was time consuming, inefficient, and frustrating. Second, the Web site did not provide the user with the ability to manage the content that was downloaded to his/her electronic toys. A family, for example, may have a number of electronic toys. There was no ability to manage the content that was downloaded by the user.

Embodiments of the invention address these and other problems, individually and collectively.

SUMMARY OF THE INVENTION

Embodiments of the invention relate to methods and systems for providing content to learning appliances. The learning appliances can be educational toys.

One embodiment of the invention is directed to a method comprising: (a) selecting a learning appliance from a set of different leaning appliances on a host site, wherein the set of learning appliances is previously selected by a user from a group of learning appliances; (b) receiving an electronic content package for the learning appliance through an electronic communication medium after (a); and (c) loading the electronic content package into the learning appliance.

Another embodiment of the invention is directed to a method comprising: (a) providing a set of different learning appliances on a host site, the set of learning appliances being previously selected from a group of different learning appliances; (b) receiving a selection of a learning appliance from the set of learning appliances; and (c) sending an electronic content package for the learning appliance to a user via an electronic communication medium.

Another embodiment of the invention is directed to a system comprising: (a) a server computer; (b) a host site on the server computer, the host site comprising a group of learning appliances from which a set of learning appliances is selected by a user; and (c) a personal profile database comprising the user's profile, wherein the personal profile database stores the set of learning appliances in the user's profile.

Another embodiment of the invention is directed to a method comprising: (a) providing a group of learning appliances from which a user selects a set of learning appliances; (b) receiving a selection of one or more learning appliances from the group of learning appliances; (c) storing the one or more selected learning appliances; (d) providing a plurality of content packages for each of the one or more learning appliances, wherein the plurality of content packages form a predetermined educational curriculum; (e) receiving a selection of a content package for the one or more learning appliances; and (f) sending the content package to the user.

Other embodiments are directed to such systems and methods where the learning appliances are electronic toys.

These and other embodiments of the invention are described in further detail below.

BRIEF DESCRIPTION OF THE DRAWINGS

FIG. 4 shows a Web page where a person can create an account.

FIG. 5 shows a Web page where a person can select a set of toys from a group of toys.

FIG. 6 shows a Web page where a user can set up a learning program and receive e-mail reminders.

FIG. 8 shows a toy that was previously selected along with a plurality of buttons for downloading content packages for the toy.

FIG. 9 shows a Web page with a selectable button for downloading audio data for a particular lesson.

DETAILED DESCRIPTION

Figure 1:
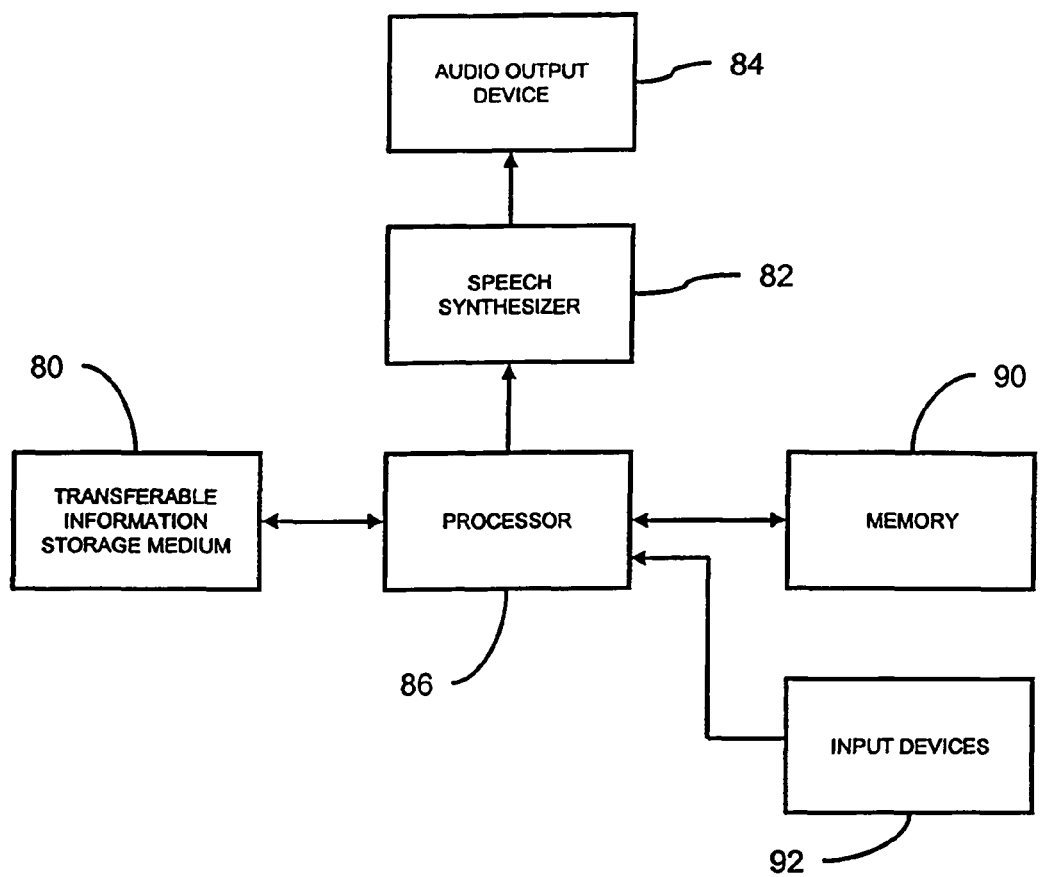
FIG. 1 shows a block diagram of some functional components of an electronic learning appliance.

For purposes of illustration, the "user" is described below in terms of an adult such as a head of household. However, it is understood that the user may alternatively be a small child, a teenager, or any other person of any suitable age. The user of the system and methods according to embodiments of the invention may or may not be the individuals who actually buy, own, or use the learning appliances. For example, in embodiments of the invention, a parent can download content packages for use in a learning appliance that is used by a child.

In some embodiments of the invention, a user pre-selects one or more learning appliances from a group of learning appliances that are listed on a host site (e.g., a Web site). The host site may be accessible through an electronic communication medium such as the Internet. A server computer that runs the host site may then store the selected set of learning appliances under the user's profile in a personal profile database. The user or the user's family may own the selected set of learning appliances, and they may have been purchased by the user (or the user's family) prior to accessing the host site.

At a later time, the selected set of learning appliances may be re-presented to the user along with buttons for downloading content packages for each of the learning appliances in the selected set. Other learning appliances that the user did not previously select are not displayed. The user may then download a content package for a specific learning appliance. After downloading, the user may use the downloaded content package with the learning appliance.

Illustratively, a user may visit a Web site and may register on it by providing appropriate identifier information (e.g., a username and password). After registering, twenty electronic toys may be presented to the user in the form of a list on a Web page of the Web site. The user may then select, for example, a set of five electronic toys out of the group including twenty electronic toys. The five selected electronic toys may be first, second, third, fourth, and fifth electronic toys and may correspond to those electronic toys that are owned by the user and/or the user's family members. A server computer may then store the selected set of toys under the user's profile in a personal profile database in communication with a server computer that runs the Web site.

The user can then visit the same Web site at a later time. After the user has accessed the Web site, the user may input appropriate the identifier information into the appropriate identifier data fields so that the user is identified. After the server computer running the Web site verifies the identity of the user, the server computer can automatically present the previously selected set of five electronic toys to the user on one or more Web pages. Sets of selectable buttons (e.g., buttons on one or more Web pages that are selectable with a mouse, trackball, or other device) are provided for each of the five toys to download content packages that are appropriate for the different toys. For example, for the first electronic toy, content packages A, B, and C may be presented on a Web site to the user for downloading. For the second electronic toy, content packages D, E, F, and G may be presented to the user for downloading. The user may download one or more of the content packages for either the first toy or the second toy. After downloading a content package for the first electronic toy, for example, the user (or another person) may load the content package into the first electronic toy. The user (or another person) may then use the modified first electronic toy.

Presenting the user with a pre-selected list of learning appliances has a number of advantages. For example, by allowing the user to pre-select different learning appliances and presenting those leaning appliances to the user at a later time, the user need not page through a number of different Web pages each time the user wants to access the host site to receive content packages for the user's learning appliances. Also, the user need not specifically search for each learning appliance that the user owns from among other learning appliances that the user does not own each time the user visits the host site. This reduces the amount of time that the user needs to spend trying to obtain the electronic content for his/her leaning appliance. Often, it is a parent who is searching for new content to update the toys that are used by a young child. Obtaining electronic content is less difficult for the parent using embodiments of the invention than the previously described conventional Web site. For example, if a child has 10 different toys, the user need not search for 10 different toys to download 10 different content packages for the user. The user need only input the user's identifier information (e.g., a password and username), and the 10 toys that the user owns are automatically presented to the user along with different content packages that are available for the toys. The user need not page through 10 different screens and/or input 10 different search terms for the 10 different toys to find content packages for them. This reduces the amount of time and potentially the amount of frustration that a busy user (or parent of the user) might experience trying to update the content for the toys.

Also, in embodiments of the invention, learning appliances can be updated and "refreshed" with new electronic content. This extends the working life of the leaning appliances like electronic toys. By comparison, in the past, electronic toys with only pre-stored content were simply used and then thrown away once a child outgrew them or became bored with their content. For example, in one embodiment of the invention, the content package for the electronic toy may comprise current factual information. The learning appliance may be, for example, an electronic, interactive, talking globe. Electronic talking globes are current commercially available from LeapFrog Enterprises, Inc., under the tradename "Explorer™". The electronic talking globe can be updated with current factual information such as current populations of countries, current facts about the countries, etc. The talking globe can be "refreshed" with current information using embodiments of the invention.

Also, in some embodiments, the content packages for a learning appliance may form a predetermined curriculum. Different toys can be used as part of a pre-defined learning strategy. Different toys can be used systematically to help a person learn about one or more subjects. For example, in some embodiments, each different content package may correspond to a different level of skill and/or each different content package may correspond to different parts of a curriculum. For example, content packages A, B, and C may correspond to electronic content (e.g., spelling lists) for week 1, week 2, and week 3 of a 3-week study course.

The educational curriculum may teach a child or student using different learning appliances various subjects in a pro-defined, organized way to maximize the use of each learning appliance. Parents who wish to teach children at home, in a systematic way to supplement a child's education, may use such predetermined curricula. This is different than simply providing a number of buttons for the user to download content packages, without providing guidance as to which content packages might be desirable to download.

The plurality of content packages corresponding to a particular learning appliance could form any suitable education curriculum. Examples of suitable curricula include teaching a child about letters, numbers, and/or shapes (e.g., the letters A-Z or the numbers 1-100). Other examples of subject matter suitable for the predetermined curricula are provided below.

In embodiments of the invention, the content packages (or curriculum formed therefrom) may be used to teach a person about any suitable subject. Such subjects include letter sounds, recognition, and usage; phonics; history; geography; spelling, fun facts; number usage and recognition; language (e.g., foreign languages); math (e.g., addition, subtraction, multiplication, division, fractions, etc.); geometry; social studies; etc. In some embodiments, the electronic content package includes data representing audio or visual outputs that correspond to different print elements on a printed sheet for use with the learning appliance. In other embodiments, the learning appliance comprises a geographic map, and the electronic content package includes data representing audio or visual outputs relating to the geographic map.

The content packages may include applications, information, problems (e.g., questions), games, etc. in static or dynamic form. The content packages may also include audio data for music, speech or sound effects for an audio output device, as well as visual data for images that may be displayed on a visual output device.

The learning appliance can be portable, can be hand-held. Such portable embodiments can be used without being in communication with the server computer (and without being in communication with the Internet). Unlike a standard desktop PC, the weight and size of such portable learning appliance embodiments is preferably such that a mall child (e.g., a six year old child) can carry and use the interactive learning appliance without difficulty.

In some embodiments, the learning appliance is preferably an electronic toy, because it is both fun and educational. For purposes of illustration, many of the specific examples provided below refer to electronic toys. It is understood that any reference below with respect to electronic toys could be applied to any suitable learning appliance. Electronic toys typically have bright colors and have some inherent fun aspect to them. The electronic toys in a group and/or in a set of electronic toys may have very different appearances and/or modes of operation.

The learning appliance may be in any suitable form. For example, the learning appliance may be an educational toy that is cylindrically-shaped. The cylindrically-shaped interactive learning appliances preferably have at least one ring, which rotates around a cylindrical body. A response input button may be at the end of the cylindrical body. The ring can be used to select problems, subject areas, and answers and may act as a rotating switch, while the input button at an end of the cylindrical-shaped toy may be depressed by the user's palm after a particular answer is chosen using the ring. Cylindrically shaped interactive learning appliances are described in U.S. Pat. No. 6,142,784, as well as U.S. patent application Ser. No. 09/632,424, filed Aug. 4, 2000, 60/168,214, filed on Nov. 30, 1999, and 60/181,967, filed on Feb. 10, 2000. All of these patents are herein incorporated by reference in their entirety. As described therein, such educational toys are compact and are designed to invoke strong kinesthetic, auditory, and visual learning modalities. In other embodiments, the interactive learning appliance can be educational toys that are in the form of a child's representation of an adult object. For instance, in some embodiments, the interactive learning appliance can be in the form of a child's laptop computer or a child's compact disk player (e.g., a "boom-box"). Examples of such educational toys are described in U.S. patent application Ser. No. 09/632,424, filed Aug. 4, 2000, 60/168,214 filed on Nov. 30, 1999, and 60/181,967 filed on Feb. 10, 2000, which are herein incorporated by reference in their entirety. Children's representations of adult objects typically have brighter colors and/or larger buttons than corresponding adult objects. An interactive learning appliance for the child may also have pictures or three-dimensional figurines of animated or moveable characters. In yet other embodiments, the interactive learning appliance may include an apparatus that includes an electrographic position location system. The apparatus could include an interactive globe or a platform with a stylus (i.e., a print media receiving unit assembly). In the latter example, a print medium such as a book is placed on the platform. Audio can be produced in response to selecting predetermined areas of the book. In some embodiments, a stylus may be used to select print elements in a print medium. Examples of such electrographic position location apparatuses are described in U.S. Pat. Nos. 5,686,705 and 5,877,458, and U.S. patent application Ser. No. 09/574,499, filed on May 19, 2000, 60/200,722, filed on Apr. 27, 2000, and 60/200, 960, filed on May 1, 2000. Yet other interactive learning appliances include interactive plush dolls of the type that are described in U.S. patent application Ser. No. 10/230,956, filed on Aug. 28, 2002, as well as interactive apparatuses like those described in U.S. patent application Ser. No. 10/218, 688, filed on Aug. 12, 2002 (entitled "Study Aid Apparatus & Method of Using Study Aid Apparatus"), Ser. No. 09/886, 399, filed on Jun. 20, 2001 (entitled "Interactive Apparatus with Templates") and Ser. No. 09/886,401, filed on Jun. 20, 2001 (entitled "Interactive Apparatus With Print Media"). All of the above U.S. Patents, and patent applications (provisional and non-provisional) are herein incorporated by reference in their entirety for all purposes.

FIG. 1 shows a block diagram of some functional components of a learning appliance according to an embodiment of the invention. The learning appliance may comprise a plastic housing (not shown) which may house one or more of a processor 86 (e.g., a microprocessor), a memory 90 (e.g., a ROM, EPROM, or EEPROM), one or more input devices 92 for the user to input information, a speech synthesizer 82, and an audio output device 84. The memory 90, the one or more input devices 92, and the audio output device 84 may all be in operative communication with the processor 86.

Suitable input devices 92 may include any suitable combination of buttons, switches, speech recognizers, alphanumeric keypads or keyboards, selection devices such as styluses, and rotary switches such as rings which can be used to select certain information (e.g., numbers, letters). Suitable audio output devices 84 include speakers and earphone jacks (with associated amplifier circuits). Other output devices that could be present in the learning appliance and that could be coupled to the processor 86 may include visual display screens (e.g., LCD screens), vibrational sensors, etc.

The memory 90 may include any suitable number of combination of volatile or non-volatile memory devices including a ROM, EPROM, or EEPROM devices. The memory 90 may include content such as music, sounds, and phrases, which can be used with any of the downloaded content packages. It may also include a number of questions, which may make up the "base content" for the learning appliance.

The speech synthesizer 82 may be a chip or circuitry within a chip that also includes the processor 86. The speech synthesizer 82 can provide a human voice to the learning appliance to guide, help, or encourage the user in learning. Batteries or a power cord (not shown) may supply power to the interactive learning appliance.

The learning appliance may also include a transferable information storage medium 80. It may be used to transfer the content package from a client computer (e.g., via a linker device) to an interactive learning appliance that is not connected to the Internet. Preferably, the transferable information storage medium can be inserted within many different types of housings for different types of interactive learning appliances. For example, the transferable information storage medium may be inserted into a cylindrically shaped housing of an interactive learning appliance or into a housing of an interactive learning appliance in the form of a child's laptop computer. A user may thus own many different types of interactive learning appliances, while using one linker device and one transferable information storage medium.

The transferable information storage medium 80 may be in any suitable form. For instance, the transferable information storage medium 80 may be a cartridge, a disk, a tape, or a memory stick. Cartridges are especially desirable since they can be easily manipulated and handled by children. Any suitable amount of storage space may be provided on the transferable information storage medium, and the transferable information storage medium may comprise a re-programmable memory device such as a flash memory device. Preferably, the housing of the learning appliance is made of plastic and is cooperatively structured to receive the transferable information storage medium 24.

Information such as questions, words, pictures, musical sounds, applications, etc. may be stored in libraries of code, libraries of resources, and libraries of applications in the learning appliance. Information such as this may be stored once in a learning appliance (e.g., in a ROM), and may be accessed according to a set of instructions provided to the processor 86. Sets of instructions for manipulating data, rather than the data files themselves, can be quickly transferred to an interactive learning appliance and stored in memory. These sets of instructions can be included in the content package. Large data files such as sound and image files need not be repeatedly transferred to and from the interactive leaning appliance. Rather, small instruction files may be transferred, thus resulting in faster data transfer and lower memory capacity requirements. Music data, for example, may be transferred to and from the interactive learning appliance according to a MIDI (Musical Instrument Digital Interface) or MIDI-like protocol. This is especially desirable when the content packages are downloaded over the Internet. Long data downloads can frustrate users.

Figure 2:
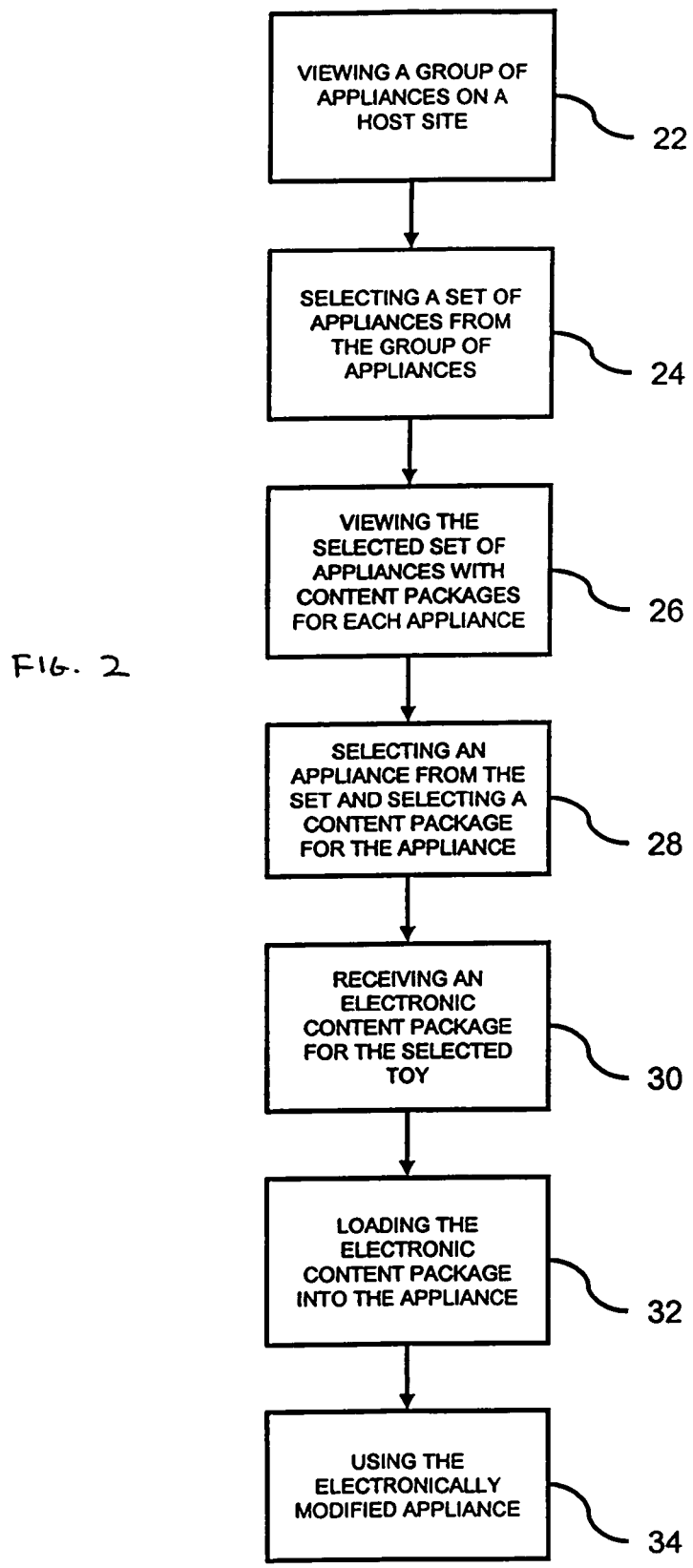
FIG. 2 shows a flowchart illustrating a method according to an embodiment of the invention.

FIG. 2 shows a flowchart illustrating a method according to an embodiment of the invention. The illustrated method includes viewing a group of learning appliances on a host site (step 22). The host site may be a Web site that is run a server computer. A user may view the group of learning appliances using standard browser software running on a client computer (e.g., a personal computer).

The user can then select one or more learning appliances from the group of learning appliances (step 24). Preferably, the user selects a set of learning appliances (i.e., two or more learning appliances) from the group of learning appliances. The one or more selected learning appliances may be owned by the user's family (e.g., a set of educational toys that are owned by two or more children in a family) or may be owned by a child in the family (e.g., a set of educational toys that are owned by a child in the family).

After the user selects the one or more leaning appliances (while visiting the host site and while using a client computer), the server computer may store the selected learning appliances in a personal profile database under the user's profile.

After the server computer stores the selected learning appliances, the server computer may then present the selected set of learning appliances to the user along with one or more suggested content packages for each learning appliance. The user may then view the selected set of learning appliances on the user's client computer along with buttons for downloading the one or more content packages (step 26). Preferably, two or more content packages are provided for each learning appliance. The two or more content packages can form a predetermined learning curriculum.

Then, the user selects a learning appliance from the set of learning appliances and selects a content package for the learning appliance (step 28). The selection of the learning appliance and the selection of the content package may take place in a single step. For example, a user can select a learning appliance and a content package for it. When the user selects a button for downloading the content package for that particular learning appliance, the user selects both the content package and the learning appliance in a single step. After selecting the learning appliance and the content package, the user receives the content package (step 30). For example, after selecting a button for the content package on a Web page, the content package is downloaded to the user's client computer.

In the above described embodiment, the user actively selects a button on a host site to download a content package. In other embodiments, a passive process could be used. For example, in some embodiments, a server computer may e-mail content packages to the user on a periodic basis and the user may load the e-mailed content packages into the user's learning appliances and then use the modified learning appliances.

In some embodiments, the content packages may have been "prescribed" by a server computer in response to a person's past interaction with an electronic learning appliance. "Prescriptive" content packages are described in further detail in U.S. Patent Application No. 60/168,214, 60/181,967, and Ser. No. 09/632,424, all of which are herein incorporated by reference in their entirety for all purposes. As described therein, an electronic learning appliance may record a user's progress, and the record of the user's progress can be uploaded to a server computer. The serves computer may then use the record of the user's performance to select content packages that address any subject areas that the user may need to address. The server computer may then present these prescriptive content packages to the user for downloading. As described in these patent applications, the electronic learning appliance may have appropriate software to adjust the intelligence of skill level of the user.

In some embodiments, the user's client computer may then store the content package that is received in a transferable information storage medium (e.g., a data cartridge). This transferable information storage medium containing the content package may then be inserted into a housing of the learning appliance and the content package can be loaded into the learning appliance (step 32). After loading the content package into the learning appliance, the user can use the electronically modified learning appliance (step 34). The learning appliance need not be in communication with the server computer or the communication medium in order to be used.

Figure 3:
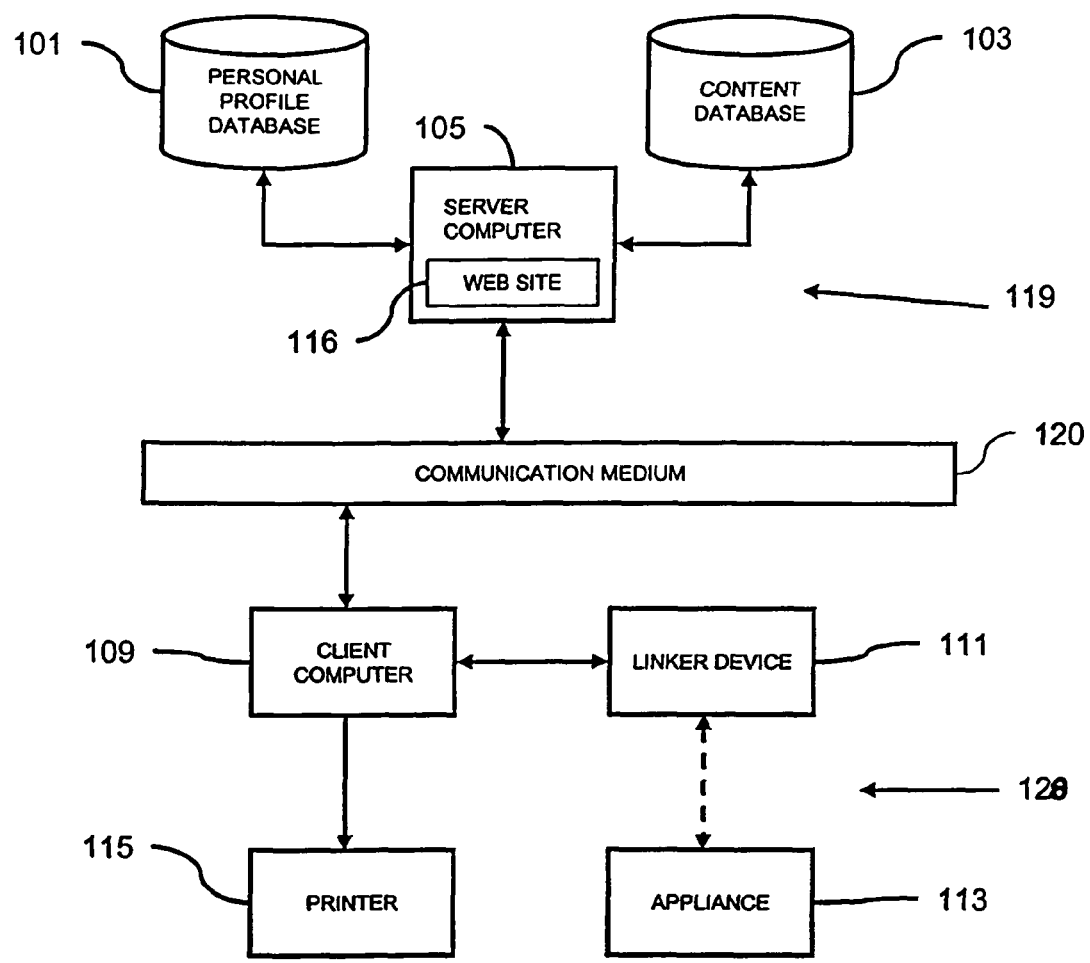
FIG. 3 shows a block diagram of a system according to an embodiment of the invention.

FIG. 3 shows a system according to an embodiment of the invention. The system includes a user location 128 where the user is present. The user location 128 may be, for example, the user's home. One user location 128 is shown for purposes of illustration. There may be many user locations in other embodiments.

The user location 128 may include a client computer 109. The client computer 109 may include a standard PC (personal computer) with a display, CPU (central processing unit), operating system (e.g., a Windows™ based operating system), hard disk drive, CD-ROM drive, etc. A printer 115 may be coupled to the client computer 109 and may be used for printing sheets that can be used with the downloaded content package. Data for the sheets can be downloaded from a server computer 105 at a remote host location 119.

At the user location 128, the client computer 109 (e.g., a personal computer) can be operatively coupled to a linker device 111. The linker device 111 may be coupled to the client computer 109 through a wireless or a wired link (e.g., a cable). A learning appliance 113 may communicate with the client computer 109 via the linker device 111.

The linker device 111 may be any suitable device capable of transferring data between the client computer 109 and the interactive learning appliance 113. The linker device 111 could be, for example, a wireless transceiver such as a wireless RF (radio frequency) transceiver or an infrared transceiver. In preferred embodiments, however, the linker device 111 is a device, which is capable of reading information from, and writing information to, the transferable information storage medium (not shown). In a typical embodiment, the transferable information storage medium may be a cartridge, which can be inserted into both the linker device 111 and the interactive appliance 113. The linker device 111 can be connected to the client computer 109 through a standard serial interface in the client computer 109.

The saver computer 105 is at the host location 119 and includes data representing a Web site 116. The server computer 105 can be in operative communication with the client computer 109 at the user location 128. The Web pages of the Web site 116 may include any number of interactive features including any suitable number of hyperlinks to help guide the user through the Web site 116, and/or selectable buttons. The Web site 116 may also have a number of graphical user interfaces for the user to input information such as his name, grade, preferences, etc. into the system. A browser on the client computer 109 permits the user or others to view the Web site 116 and pages thereof. Examples of suitable browsers include Internet Explorer™, which is commercially available from Microsoft. Access to the Web site 116, and in particular to the user's information (e.g., profile information), may be restricted by requiring that any visitors enter an identifier (e.g., a password) to show that the persons accessing the information have proper authorization.

The server computer 105 is typically a powerful computer or cluster of computers. For example, the server computer 105 can be a large mainframe, a minicomputer cluster, or a group of servers functioning as a unit. In one example, the server computer 105 may be a database server coupled to a Web server. Moreover, the server computer 105 can behave as a single computer, which services the requests of one or more client computers. Client computers, such as the client computer 109 can communicate with the server computer 105 through the Internet and optionally through one or more Internet Service Providers (ISPs) (not shown). The client computer 109 typically has less memory and less computing power than the server computer 105.

The server computer 105 may have access to one or more databases of information. As shown in FIG. 3, the server computer 105 may have access to a personal profile database 101 and an electronic content database 103. The personal profile database 101 may include the user's personal preferences and information about the user. Exemplary personal profile information may include information such the user's age, hobbies, address, phone number, e-mail address, school, favorite subjects, relatives, teachers, favorite songs, favorite sports, favorite foods, favorite cartoons, etc.

The electronic content database 103 contains content for the content packages that are sent to the user location 128. As noted above, any suitable content may be included in the content package. The content may be in the form of static information, dynamic information, sound files, video files, applications, etc. The content may include problems (e.g., questions, puzzles, riddles, quizzes), as well as songs, games, hints, music, facts, greetings, and messages (e.g., help, encouragement, or error messages). Additional examples of content that can be stored in the electronic content database 103 are provided below and above.

The system, and especially the server computer 105, can include one or more computer programs, written in any suitable computer language. For example, first, second, and third computer programs used for performing three different functions can be embodied in a single computer program having one or more subroutines, or may be embodied by three separate and distinct computer programs. In embodiments of the invention, for instance, the server computer 105 may have one or more computer programs to: update a personal profile in a personal profile database, retrieve data from any suitable database, and send data to any person. One or more computer programs may also be provided to select content for and assemble a content package for the user, and send the content package to the user.

The server computer 105 and the client computer 109 communicate through the electronic communication medium 120. The communication medium may include intranets, or the Internet, and more particularly the World Wide Web (WWW) (or variants thereof). Typical communication protocols include HTTP (hypertext transfer protocol) and TCP/IP (terminal communication protocol/internet protocol). The communication medium 120 may include wired or wireless communication links.

Figure 7:
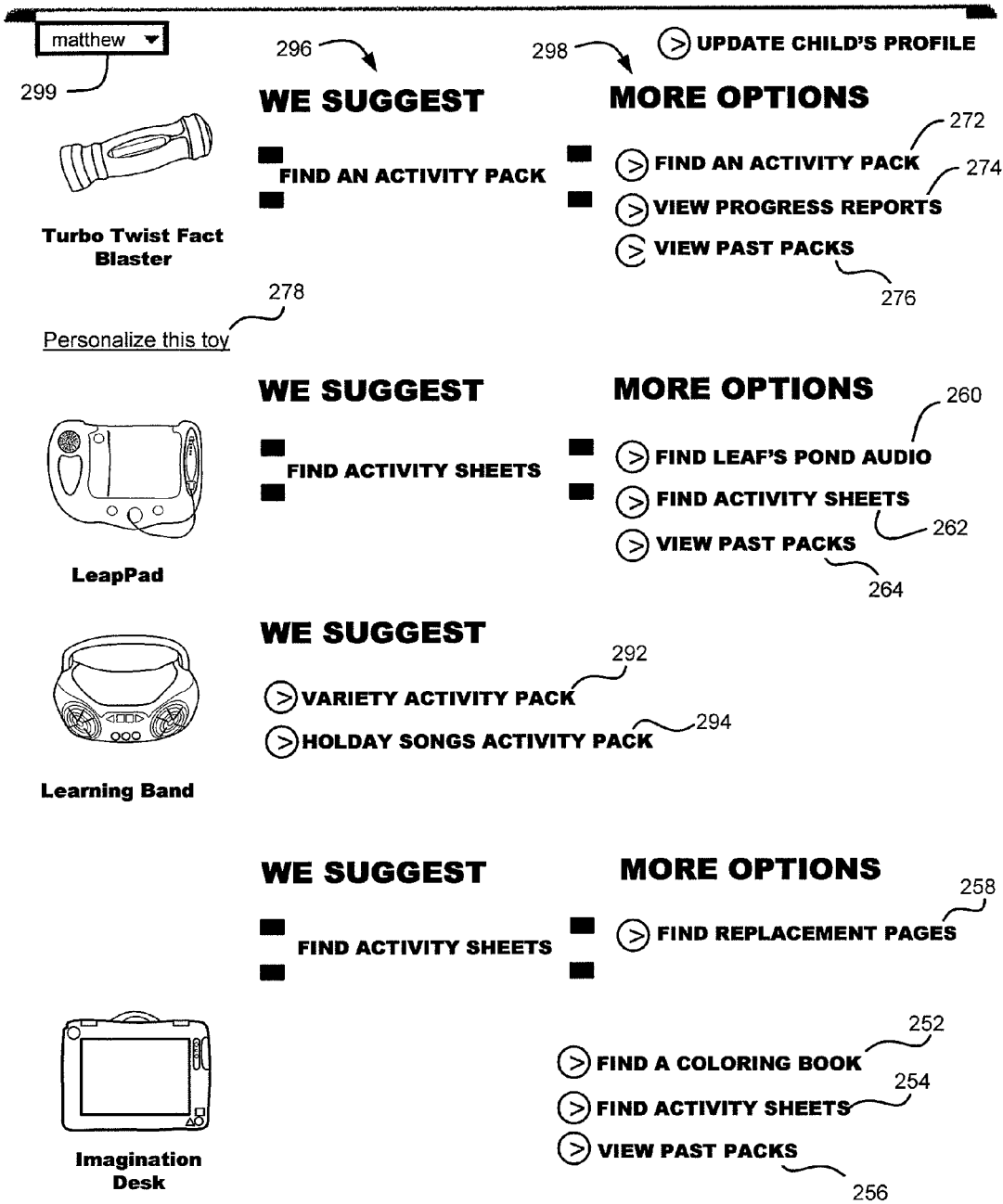
FIG. 7 shows a Web page showing toys that were previously selected, and also showing buttons for obtaining content packages for each of the selected toys.

A number of Web pages that are presented to the user are shown in FIGS. 4-10. FIG. 4 shows Web page where a user can register on a Web site. FIG. 5 shows a Web page where the user can register the user's child's name, birthday, and grade, and can also select a set of toys from a group of toys. FIG. 6 shows a Web page where a user can select from different lesson plans for the various electronic toys that a user's child may use. FIG. 7 shows a Web page showing the set of toys previously selected, along with descriptions of various content packages that can be downloaded for each of the toys in the set. FIGS. 8 and 9 show Web pages with buttons for downloading content packages that can be used with a toy called the Imagination Desk™. Each of the Web pages shown in FIGS. 4-9 is described in further detail below, with additional reference to FIGS. 2 and 3.

Referring to FIG. 3, a user (e.g., an adult or a child) at a client location 128 may use the client computer 109 to contact the server computer 105 via the communication medium 120 and access the Web site 116. After the user has accessed the Web site 116, the user may register him/herself and/or his/her children.

FIG. 4, for example, shows a Web page where a user may create an account for the user's family. The "create account" page has data fields 210 for entering a user name, password, first name, last name, year of birth, and e-mail address. There is also a data field for a family Web page name so that the user's family has a unique Web page when any member of the family visits the Web site 116. After the use has filled in the data fields 210, the user may select the "next step" button 214 at the bottom of the Web page.

After the user has created an account, the user may register each child in his/her family, and may indicate the particular electronic toys that are owned and/or used by each child. At this time, the user may view a group of toys and may select a set of toys from the group of toys (steps 22, 24 in FIG. 2). FIG. 5, for example, shows a Web page including a data field 224 where a user can register a child by entering the child's first name. The user may then select a set of electronic toys that the child uses. For example, eleven electronic educational toys are listed in a section 222 of the Web page shown in FIG. 5. The eleven educational toys that are listed are commercially available from LeapFrog Enterprises, Inc. of Emeryville, Calif. A user may, for example, select a set of four of the eleven toys listed that are used by the listed child "Matthew". In this example, the user has selected the toys called the Imagination Desk™, Leap's Learning Band™, the LeapPad™ Learning System, and the Turbo Twist™ Fact Blaster.

The user may also enter the child's school grade and birthday in the data fields 226 on the Web page shown in FIG. 5. As will be described below, this information may be used to automatically identify a pro-determined curriculum for the child for each of the toys. Using this information, the server computer 105 can automatically select certain curricula that are appropriate for either the child's grade or age and provide these as suggested curricula for use with the various toys.

After the user has entered the child's first name in the data field 224, selected a set of toys in the section 222, and entered the child's grade and birthday in the data fields 226, the user may select the button 228 at the bottom of the Web page to add another child. The same or different set of educational toys can be selected for the next child. If the adult has no other child to add, the user may select the "next step" button 230 to go on to the next step in the process.

As shown in FIG. 6, the user may select from different pro-defined learning strategies as shown in the Web page illustrated in FIG. 6. As shown by the section 232 of the Web page, the Web page may be personalized so that the user knows that a particular lesson plan is being selected for a particular child. On this Web page, a predetermined curriculum can be selected for the particular educational toy and for a particular person. For example, a predetermined curriculum in the form of a 52-week program, or a self-paced learning program can be selected. A parent or child may choose which curriculum suits the person the best. On this Web page, the user may indicate in selectable boxes 238 that the user wants e-mail reminders to remind the user to visit the Web site 116, and download the next lesson. The e-mail reminders may be sent on a periodic basis (e.g., daily, weekly, monthly). The e-mail reminders may be used as a non-intrusive way to remind persons using the system when they should have completed previous lessons and/or when they should download the next lesson. Thus, various lesson plans can be practiced with various electronic toys. After the user has selected a lesson plan, the "continue" button 240 at the bottom of the Web page may be selected.

Referring to FIG. 3, the information provided by the user on the Web pages shown in FIGS. 4-6 may be stored in the personal profile database 101 using the server computer 105. Other information, including progress reports and other user specific information may be included in the personal profile database 101.

After the server computer 105 stores the list of selected educational toys, the server computer 105 retrieves the selected toys from the personal profile database 101 and then displays them on the Web site 116 after the user the contacts the Web site 116 to obtain content packages for specific educational toys. Selectable buttons for downloading content packages may be displayed along with the toys. The user can view the selected toys along with descriptions of various content packages and their associated selectable buttons (steps 26 and 28 in FIG. 2).

FIG. 7, for example, shows a Web page with the selected toys along with buttons for accessing content packages for each of the toys. The Web page indicates that it is the "Smith Family" Web page. The drop down window 299 indicates that the toys used by the child Matthew are currently being displayed. The shown images of four toys are: "Turbo Twist Fact Blaster™"; "LeapPad™"; "Learning Band™"; and "Imagination Desk®".

A number of selectable buttons are provided on the Web page shown in FIG. 7. There are two columns of selectable buttons. The first column is a "we suggest" column 296 that includes buttons for suggested content packages that can be downloaded. The second column is a "more options" column 298 where various buttons for various options are provided. The following selectable buttons are provided for the following toys: "Turbo Twist Fact Blaster™" (a button to find a content package (or "activity pack"), 272, a button to view progress reports 274 (as described in further detail in U.S. patent application Ser. No. 09/632,424, filed on Aug. 4, 2000), and a button to view previous content packages that have been already downloaded 276); "LeapPad™" (a button for finding content packages with audio 260; a button for finding activity sheets that are used with the toy 262; and a button for viewing previous content packages that have already been downloaded 264); "Learning Band™" (buttons to download various content packages that include songs 292, 294); and "Imagination Desk™" (a button for finding replacement pages 258 for a user to draw on; a button 252 to find a coloring book; a button for finding activity sheets and audio 254; and a button to view past content packages that have been downloaded 256). The downloading of activity sheets and downloading audio for an interactive apparatus is described in U.S. patent application Ser. No. 09/886,401, filed on Jun. 20, 2001.

Illustratively, the user may select the "find activity sheets" button 254. After selecting this button 254, a Web page like the one shown in FIG. 8 may be presented to the user. As shown in FIG. 8, buttons 300 (labeled "GET") are provided for different content packages. As shown, the different content packages may form part of a predetermined curriculum that is to be used with the toy to teach a child about letters and phonics. For example, the Imagination Desk™ activity sheets may be downloaded to the user's site along with audio for the sheets. A "view past activity packs" button 302 is shown so that a user can view what content packages have been already downloaded. This assists the user in keeping track of which content packages have been used so that new content packages can be used with the various toys.

After the user selects, for example, the button for "week 15" in the Web page shown in FIG. 8, a Web page like the one shown in FIG. 9 is presented to the user. A button 306 to download audio is provided. After selecting this button 306, the content package that is associated with "Week 15", get ready for kindergarten, is sent from the server computer 105 through the communication medium 120, and to the client computer 109. The downloaded content package may comprise audio for the lesson plan associated with Week 15. After the client computer 109 receives the content package, it is transferred to the linker device 111. The linker device 111 may thereafter store the content package on a transferable information storage medium (not shown) that is insertable in the linker device 111. The user may remove the transferable information storage medium and than insert it into the learning appliance 113 (which could be the Imagination Desk™ toy shown in FIG. 9). The content package is loaded into the learning appliance 113 and the user may use the learning appliance 113 (steps 32 and 34 in FIG. 1). The learning appliance 113 need not be in communication with the communication medium 120 or the server computer 105 to be used.

After downloading the content package, the user may print activity sheets that are provided by the server computer

105. The activity sheets may be downloaded to client computer 109 and may be in the form of standard image files (e.g., image files that are in Adobe Acrobat™), and the sheets may be printed on the printer 115. The printed sheets may be used with a learning appliance along with a downloaded content package. For example, the sheets and the downloaded audio may then be used with the Imagination Desk™ toy that is shown in FIG. 9.

Embodiments of the invention have a number of advantages. For example, using embodiments of the invention, a user is able to "manage" the downloaded content for the variety of interactive leaning appliances that a family might own. Specific lesson plans can be provided for each person in the family, and for each interactive learning appliance that is owned by the family. Content in the learning appliances can be changed so that the interactive learning appliances are "re-freshed" with new content. The learning appliances consequently have a longer useful life as compared to leaning appliances that are cannot be electronically changed. Lastly, the ability to pre-select a set of learning appliances from a larger group of learning appliances accelerates the process of downloading content from a server computer. A user can be automatically presented with the electronic learning appliances that are owned by the user's family, without the need to sift through various other Web pages with learning appliances that are not of interest to the user.

The terms and expressions which have been employed herein are used as terms of description and not of limitation, and there is no intention in the use of such terms and expressions of excluding equivalents of the features shown and described, or portions thereof; it being recognized that various modifications are possible within the scope of the invention claimed. Moreover, any one or more features of any embodiment of the invention may be combined with any one or more other features of any other embodiment of the invention, without departing from the scope of the invention.

All references, patent applications, and patents mentioned above are herein incorporated by reference in their entirety for all purposes. None of them are admitted to be prior art to the presently claimed inventions.

What is claimed is:

1. A method for using a client computer to download a content package to a learning appliance toy, the method comprising:
   (a) selecting the learning appliance toy and the content package, by a user, from a set of different learning appliance toys with one or more content packages provided for each learning appliance toy, using a user interface on a host site displayed on the client computer, wherein the set of learning appliance toys is previously selected by the user from a group of learning appliance toys, wherein images of the set of different learning appliance toys or names for the learning appliance toys in the set on the host site are displayed on the client computer;
   (b) receiving an electronic content package on the client computer for the learning appliance toy through an electronic communication medium in response to (a); and
   (c) loading the electronic content package from the client computer into the learning appliance toy using the user interface,
   wherein the learning appliance toys in the set of learning appliance toys are owned by the user or a family; and wherein the electronic content package includes educational content based on the user's personal profile information and forms part of a pre-determined educational curriculum, and wherein the method further comprises:
   selecting the curriculum, by the user, on the client computer, prior to (a),
   wherein the learning appliance toy includes one or more movable rings or movable buttons that is used to operate the learning appliance toy.

2. The method of claim 1 further comprising:
   (d) before (a), purchasing the learning appliance toy.

3. The method of claim 1 wherein all of the learning appliance toys in the set are portable.

4. The method of claim 1 wherein (b) receiving comprises receiving the content package through the Internet, and wherein the host site is a Web site.

5. The method of claim 1 wherein selecting the content package further comprises:
   reviewing a plurality of electronic content packages displayed on the client computer associated with the selected learning appliance toy; and
   selecting the electronic content package from the plurality of content packages.

6. The method of claim 1 further comprising:
   (e) transferring the electronic content package from the client computer to a linker device; and
   (f) transferring the electronic content package from the linker device to a non-transitory information storage medium, wherein the non-transitory information storage medium is insertable into a housing of the learning appliance toy.

7. The method of claim 1 wherein loading the electronic content package further comprises loading a plurality of electronic content packages from the client computer into the learning appliance toy, wherein the plurality of electronic content packages form a curriculum.

8. The method of claim 7 wherein loading the electronic content package further comprises loading the plurality of electronic content packages into a plurality of learning appliance toys, wherein the electronic content packages form a curriculum when used in the plurality of learning appliance toys.

9. The method of claim 1 wherein loading the electronic content package further comprises loading the electronic content package from the client computer into a plurality of learning appliance toys, wherein the electronic content package forms a curriculum when used in the plurality of learning appliance toys.

10. The method of claim 1 wherein (a) selecting the learning appliance toy and content package, by the user, from the set of different learning appliance toys with one or more content packages provided for each learning appliance toy, using the user interface on the host site displayed on the client computer, comprises selecting a button for downloading the content package to the client computer.

11. The method of claim 10 wherein the different learning appliance toys all teach math.

12. The method of claim 1 wherein selecting the learning appliance toy and the content package comprises selecting a button for downloading the content package for the learning appliance toy to select both the content package and the learning appliance toy in a single step.

13. The method of claim 1 wherein the content package comprises current factual information including at least one of current populations of countries, and current facts about countries.

14. The method of claim 1 wherein the content package forms a predetermined curriculum.

15. The method of claim 1 wherein the content package is a game.

16. A computer program product comprising a non-transitory computer-readable medium having a computer program embodied therein, the computer program adapted to be executed to cause a server to implement a method comprising:
- (a) providing a set of different learning appliance toys on a host site, the set of learning appliance toys being previously selected from a group of different learning appliance toys, wherein images of the set of different learning appliance toys or names for the learning appliance toys in the set on the host site are displayed on a client computer;
- (b) presenting to a user, through the host site displayed on the client computer, the set of learning appliance toys along with different content packages for each of the learning appliance toys in the set of learning appliance toys;
- (c) receiving a selection of a learning appliance toy and a content package from the set of learning appliance toys and different content packages for each of the learning appliance toys in the set of learning appliance toys; and
- (d) sending an electronic content package for the learning appliance toy to the client computer via an electronic communication medium in response to (c), wherein the user or the user's family owns the set of learning appliance toys; and wherein the electronic content package includes educational content based on the user's personal profile information and forms part of a pre-determined educational curriculum, and wherein the method further comprises receiving a selection, from the user, of the curriculum prior to (c), wherein the learning appliance toy includes one or more movable rings or movable buttons that is used to operate the learning appliance toy.

17. The computer program product of claim 16 wherein the method further comprises:
- (e) receiving the selection of the set of learning appliance toys from the group of learning appliance toys from the client computer.

18. The computer program product of claim 16 further comprising, before (a):
- (e) storing the selected set of learning appliance toys in a personal profile database.

19. The computer program product of claim 16, further comprising, after (a), entering an identifier for the user, and then performing (b) automatically after entering the identifier.

20. The computer program product of claim 16, wherein the method further comprises receiving an identifier for the user, and then automatically performing (a) after the identifier is received.

21. The computer program product of claim 16 wherein the different learning appliance toys all teach math.

22. The method of claim 16 wherein the method further comprises:
- (e) receiving the selection of the set of learning appliance toys from the group of learning appliance toys from the client computer.

23. The computer program product of claim 16 further comprising, before (a):
- (e) storing the selected set of learning appliance toys in a personal profile database.

24. A method comprising:
- (a) providing a set of different learning appliance toys on a host site, the set of learning appliance toys being previously selected from a group of different learning appliance toys, wherein images of the set of different learning appliance toys or names for the learning appliance toys in the set on the host site are displayed on a client computer;
- (b) presenting to a user, through the host site displayed on the client computer, the set of learning appliance toys along with different content packages for each of the learning appliance toys in the set of learning appliance toys;
- (c) receiving a selection of a learning appliance toy and a content package from the set of learning appliance toys and different content packages for each of the learning appliance toys in the set of learning appliance toys; and
- (d) sending an electronic content package for the learning appliance toy to the client computer via an electronic communication medium in response to (c), wherein the user or the user's family owns the set of learning appliance toys; and wherein the electronic content package includes educational content based on the user's personal profile information and forms part of a pre-determined educational curriculum, and wherein the method further comprises receiving a selection, from the user, of the curriculum prior to (c), wherein the learning appliance toy includes one or more movable rings or movable buttons that is used to operate the learning appliance toy.

* * * * *